(12) United States Patent
Tate et al.

(10) Patent No.: US 8,816,985 B1
(45) Date of Patent: Aug. 26, 2014

(54) METHODS AND APPARATUS TO DETECT A TOUCH PATTERN

(71) Applicant: Cypress Semiconductor Corporation, San Jose, CA (US)

(72) Inventors: Daniel Tate, Seattle, WA (US); Edward Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 9 days.

(21) Appl. No.: 13/723,020

(22) Filed: Dec. 20, 2012

Related U.S. Application Data

(60) Provisional application No. 61/703,376, filed on Sep. 20, 2012.

(51) Int. Cl.
*G06F 3/041* (2006.01)
*G06F 3/044* (2006.01)

(52) U.S. Cl.
CPC .................... *G06F 3/044* (2013.01);
*G06F 3/041* (2013.01)
USPC ........................................................ 345/173

(58) Field of Classification Search
CPC ........ G06F 3/041; G06F 3/0418; G06F 3/044
USPC ...................... 345/173–184; 178/18.01–20.04
See application file for complete search history.

(56) References Cited

U.S. PATENT DOCUMENTS

| 5,355,503 A | 10/1994 | Soffel et al. | |
|---|---|---|---|
| 5,543,591 A * | 8/1996 | Gillespie et al. | 178/18.03 |
| 5,553,296 A | 9/1996 | Forrest et al. | |
| 5,977,957 A | 11/1999 | Miller et al. | |
| 7,176,902 B2 | 2/2007 | Peterson, Jr. et al. | |
| 7,657,849 B2 | 2/2010 | Chaudhri et al. | |
| 8,046,721 B2 | 10/2011 | Chaudhri et al. | |
| 2006/0007166 A1* | 1/2006 | Lin et al. | 345/173 |
| 2007/0229468 A1* | 10/2007 | Peng et al. | 345/173 |
| 2008/0158167 A1* | 7/2008 | Hotelling et al. | 345/173 |
| 2008/0284739 A1 | 11/2008 | Andrews et al. | |
| 2009/0009194 A1* | 1/2009 | Seguine | 324/684 |
| 2009/0009195 A1 | 1/2009 | Seguine | |
| 2009/0284482 A1* | 11/2009 | Chin | 345/173 |
| 2010/0156813 A1 | 6/2010 | Duarte et al. | |
| 2011/0300934 A1 | 12/2011 | Toy et al. | |
| 2011/0302538 A1 | 12/2011 | Vennelakanti et al. | |
| 2012/0005509 A1 | 1/2012 | Araki et al. | |
| 2012/0007836 A1 | 1/2012 | Wu et al. | |
| 2012/0154324 A1* | 6/2012 | Wright et al. | 345/174 |
| 2012/0191993 A1* | 7/2012 | Drader et al. | 713/320 |

FOREIGN PATENT DOCUMENTS

WO 2012075197 A 6/2012

OTHER PUBLICATIONS

International Search Report for International Application No. PCT/US13/21393 dated Mar. 25, 2013; 2 pages.

(Continued)

*Primary Examiner* — Liliana Cerullo

(57) ABSTRACT

A method and apparatus detect a first portion of a touch sequence through operating in a first scan mode and detect a second portion of the touch sequence through operating in a second scan mode. A touch sequence may be detected based on the detection of the first portion and the detection of the second portion.

20 Claims, 12 Drawing Sheets

(56) References Cited

OTHER PUBLICATIONS

Written Opinion of the International Searching Authority for International Application No. PCT/US13/21393 dated Mar. 25, 2013; 5 pages.

"How to Unlock Touchpad on HP Probook 4530s?," askmefast.com [online] [retrieved on Jun. 9, 2014], retrieved from <URL: http://www.askmefast.com/How_to_unlock_touchpad_on_HP_Probook_4530s-qna1166801.html>.

Hopewell, Luke, "Sony SmartWatch Review: Not Smart Enough," Gizmodo Australia [online], published on Jul. 13, 2012 [retrieved on Jun. 9, 2014], retrieved from internet <URL: http://www.gizmodo.com.au/2012/07/sony-smartwatch-review-not-smart-enough/>.

Orantia, Jenneth, "BlackBerry 10 hands-on," The Age Digital Life [online], Oct. 3, 2012 [retrieved on Jun. 12, 2014], retrieved from the internet <URL: http://www.theage.com.au/digital-life/mobiles/blackberry-10-handson-20121003-26uhf.html>.

* cited by examiner

| PORTION | SELECTED DURATION RANGES | |
|---|---|---|
| | MIN. DURATION | MAX. DURATION |
| DURATION OF TOUCH 1, (T1) | 80ms | 120ms |
| DURATION OF ABSENCE OF A TOUCH, (T2) | 80ms | 200ms |
| DURATION OF TOUCH 2, (T3) | 80ms | 120ms |

FIG. 6

| PORTION | NUMBER OF SCANS PORTION DETECTED TO BE CONSIDERED TO FALL WITHIN SELECTED DURATION RANGE |
|---|---|
| DURATION OF TOUCH 1, (T1) | 2 - 6 |
| DURATION OF ABSENCE OF A TOUCH, (T2) | 4 - 10 |
| DURATION OF TOUCH 2, (T3) | 4 - 6 |

*FIG. 7*

| POWER STATE | SCAN RATE | SENSING TYPE | DECISION TO TRANSITION |
|---|---|---|---|
| ACTIVE | 120 Hz | MUTUAL CAPACITANCE | TOUCH CONTROLLER |
| LOOK FOR TOUCH | 100 Hz | SELF CAPACITANCE | TOUCH CONTROLLER |
| LOW POWER | 50 Hz | SELF CAPACITANCE | TOUCH CONTROLLER |
| TAP-TAP (ACTIVE) | 50 Hz | SELF CAPACITANCE | TOUCH CONTROLLER |
| TAP-TAP (LOOK FOR TOUCH) | 20 Hz | SELF CAPACITANCE | HOST |
| DEEP SLEEP | NO SCAN | N/A | HOST |

FIG. 11

METHODS AND APPARATUS TO DETECT A TOUCH PATTERN

RELATED APPLICATIONS

This application claims the priority benefit of U.S. Provisional Application No. 61/703,376, filed Sep. 20, 2012, which is incorporated herein by reference in its entirety.

TECHNICAL FIELD

The subject matter relates to the field of interpreting user input. More specifically, but not by way of limitation, the subject matter discloses techniques for detecting a touch pattern.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device. Computing devices, including those designed to function at least part of the time on battery power, may operate in multiple power consumption modes including one or more low power modes that consume less power relative to another power consumption mode. Various forms of user input may be used to transition a computer device to and from different power consumption modes.

One type of user interface device that has become more common operates by way of capacitance sensing. A capacitance sensing system may include a touchscreen, touch-sensor pad, a touch-sensor slider, or touch-sensor buttons, and may include an array of one or more capacitive sensor elements. Capacitive sensing typically involves measuring, through sensor signals, a change in capacitance associated with the capacitive sensor elements to determine a presence of a conductive object relative to the capacitive sensor elements.

BRIEF DESCRIPTION OF THE DRAWINGS

Some embodiments are illustrated by way of example and not limitation in the figures of the accompanying drawings in which:

FIG. 6 is a table diagram illustrating selected duration ranges for portions of a valid touch sequence of FIG. 5, in accordance with an embodiment;

FIG. 7 is a table diagram illustrating ranges of actual detections for portions of the touch sequence of FIG. 5 to be considered to fall within the selected durations ranges of FIG. 6, in accordance with an embodiment;

FIG. 11 is a table diagram illustrating power states of an electronic system, in accordance with an embodiment.

DETAILED DESCRIPTION

Figure 1:
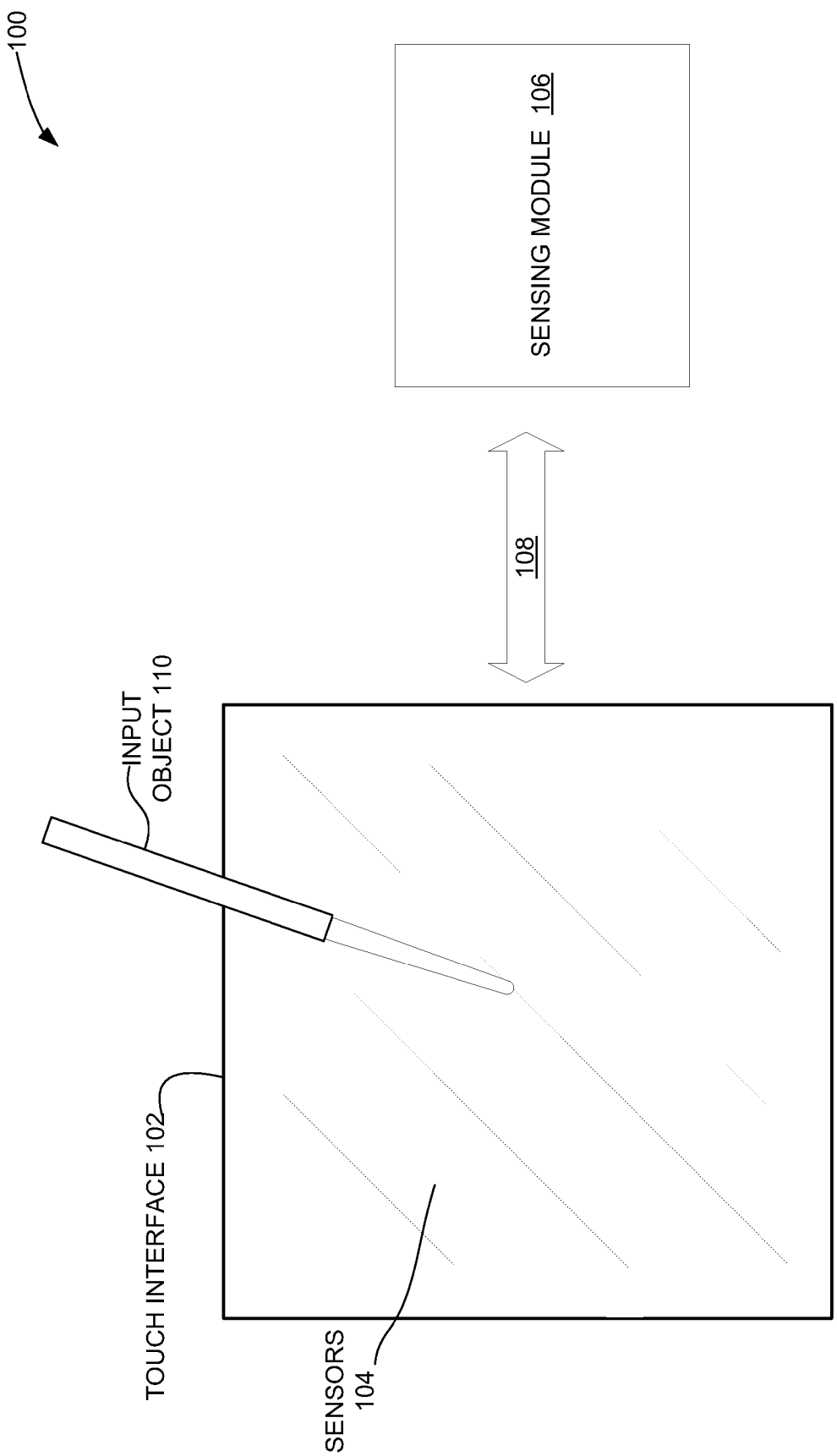
FIG. 1 is a block diagram illustrating a sensing system, in accordance with various embodiments.

Methods and apparatus to detect a touch pattern are described. In the following description, for purposes of explanation, numerous examples are set forth in order to provide a thorough understanding of the embodiments. It will be evident to one skilled in the art that the claimed subject matter may be practiced in other embodiments. The detailed description discloses examples of technology that, among other things, uses multiple scan modes to detect a touch pattern. Some embodiments are now briefly introduced and then discussed in more detail along with other embodiments beginning with FIG. 1.

Some touchscreen devices, such as cell phones or tablets, operate in a low power consumption mode (e.g., a sleep mode) for a significant portion of their service life rather than in a higher power consumption mode under which the device may also operate. In such a device, power consumption can be reduced, for example, by removing power as part of the low power consumption mode from a display (e.g., liquid crystal display (LCD), light-emitting diode (LED) display, active matrix organic light emitting display (AMOLED)), host resources of the device, and/or by reducing power to a touch controller of the device. The process of a device transitioning from a lower power consumption mode to a higher power consumption mode is sometimes referred to as "waking up." Some devices are configured to wake up when a user provides input such as by pressing a mechanical button of the device or by causing all or part of the device to accelerate (e.g., by shaking or tapping the device).

Embodiments described herein allow a device to wake up responsive to a user inputting a touch pattern to a touch interface of the device. This, wake up can be accomplished without a need for mechanical buttons or accelerometers and while minimizing both surface area used by components and the power consumption associated with sensing a wake up touch pattern provided by a user. A touch pattern and/or a portion thereof may include one or more of a start of a touch, lift-off of a touch, durations of one or more touches, a duration between touches, a sequence of touches, shapes of one or more touches, positions of one or more touches, movements of one or more touches, multiple simultaneous touches, proximities or hovering of one or more input objects over a touch interface, forces associated with one or more touches, other attributes of a touch pattern, and/or a combination of these.

In an embodiment, a touch controller operates in multiple scan modes to recognize a touch pattern indicating that processing and other higher-level resources (e.g., display, radio, haptics engine) should wake up. In various embodiments, which are described further below, a scan mode may have characteristics such as, scan frequency (e.g., scan rate or refresh rate), sensing type (e.g., self-capacitance scans, mutual-capacitance scans, or hybrid sensing modes containing elements of both self- and mutual-capacitance), scan locations (e.g., scanning targeted portions of the touch input surface), other characteristics, and/or combinations thereof.

The scan rates (e.g., of the scan modes) can be tuned to minimize power consumption while still allowing reliable detection of touch patterns (e.g., a touch sequence such as a double tap). In an embodiment, the touch controller detects a first portion of the touch pattern through a first scan mode (e.g., the first scan mode including a relatively lower scan rate) and detects a second portion of the touch pattern through a second scan mode (e.g., the second scan mode including a relatively higher scan rate). In an embodiment, the first scan mode with the lower scan rate consumes less power than the second scan mode with the higher scan rate and the touch controller remains in the lower power consumption first scan mode until the first portion of the touch pattern is detected. In embodiments, scan modes including self-capacitance scans and/or scanning targeted areas of the touch interface for a touch pattern reduces scan time, and thus, reduces power consumption. Separating touch pattern recognition into different scan modes can minimize a sensing system's overall power consumption. In an embodiment, recognizing the touch pattern triggers the device to wake up. It will be noted that recognizing the touch pattern may alternatively or additionally enable or initiate some other device function such as allowing access to a protected memory or other protected area of the device.

When the embodiments described herein are performed by a touch controller of a device, other processors of the device may be allowed to sleep while only the touch controller looks for a wake event, thus saving power. Furthermore, the described embodiments provide for wake-up without the need of a physical button or accelerometer, thus saving material costs, avoiding failure modes of physical parts, or enabling redundant wake capabilities in case one becomes non-operative. Characteristics of the multiple scan modes may be configurable to meet performance targets while minimizing scan frequency, scan time, and scan area, so as to minimize overall power consumption of the device.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating a sensing system 100, in accordance with various embodiments. The sensing system 100 includes a touch interface 102 coupled with a sensing module 106. For some embodiments, the touch interface 102 may include the sensing module 106 (e.g., which may provide functionality of a touch controller). The touch interface 102 receives input from a user through an input object 110 (e.g., a stylus, a finger, or any other object used to provide input). The touch interface 102 may include a touch pad, a touchscreen, or any touch input interface. In various embodiments, the sensing system 100 may provide the functionality of a touchscreen, a touchpad, a slider, a button, a switch, a level sensor, a proximity sensor, a displacement sensor, a combination thereof, or provide some other functionality based on a detection of a user input.

The touch interface 102 includes sensors 104. In various example embodiments, the sensors 104 may include one or more of light-sensitive elements, light emitting elements, photosensitive elements, pressure sensitive elements, and/or capacitive sensor elements. In some embodiments, the sensors 104 are embedded into an image display of the touch interface 102. This is sometimes referred to as in-cell sensing. For example, a photosensitive element may be embedded into each display pixel of the image display. The photosensitive elements sense light reflected by an input object back into the cell, or may detect a shadow cast by an object on the surface of the display.

The input object 110 is shown to be proximate to or in contact with the touch interface 102 and is used to provide input to the touch interface 102. In this example, the input object 110 is a stylus. In an embodiment, the diameter of the stylus is around 1 mm, which is considerably less than the diameter of a typical finger. The input object 110 may be a non-conductive object, a conductive object, and/or may produce light or other energy to be sensed through the sensors 104, without departing from the claimed subject matter. In an embodiment, the input object 110 is passive meaning that it is not electrically powered to provide input to the touch interface 102. Alternatively or additionally, the input object 110 may be active meaning that it is electrically powered to provide input to the touch interface 102. The input object 110 may be fixed in position or moveable in position relative to the touch interface 102. For example, a user may move the input object 110 relative to the touch interface 102. The user may include a human, a mechanism, a machine, and/or programmed instructions. Alternatively or additionally, the touch interface 102 may be allowed to move relative to a fixed or movable input object 110.

The sensing module 106 senses or detects, using the sensors 104, a presence of one or more input objects proximate or in contact with one or more of the sensors 104 of the touch interface 102. The sensing module 106 may perform operations (e.g., scan operations) to sense, using the sensors 104, signals indicating the presence of the one or more input objects (e.g., the input object 110). Depending on the type of sensors used and what properties they sense, a sensor signal may indicate a pressure applied to the touch interface 102, light (e.g., infrared light) associated with an input object, an image associated with an input object, a capacitance of the sensors 104 and/or a change in capacitance of one or more of the sensors 104 when an input object is proximate to or in contact with the touch interface 102. The transmission media 108 may include any medium appropriate for the scan operation and through which the sensor signals may be conveyed. For some embodiments, the transmission media 108 includes metal traces (e.g., copper wire) coupled to the sensors. An example of the touch interface 102 and the arrangement of its sensor elements are now discussed with respect to FIG. 2.

Figure 2:
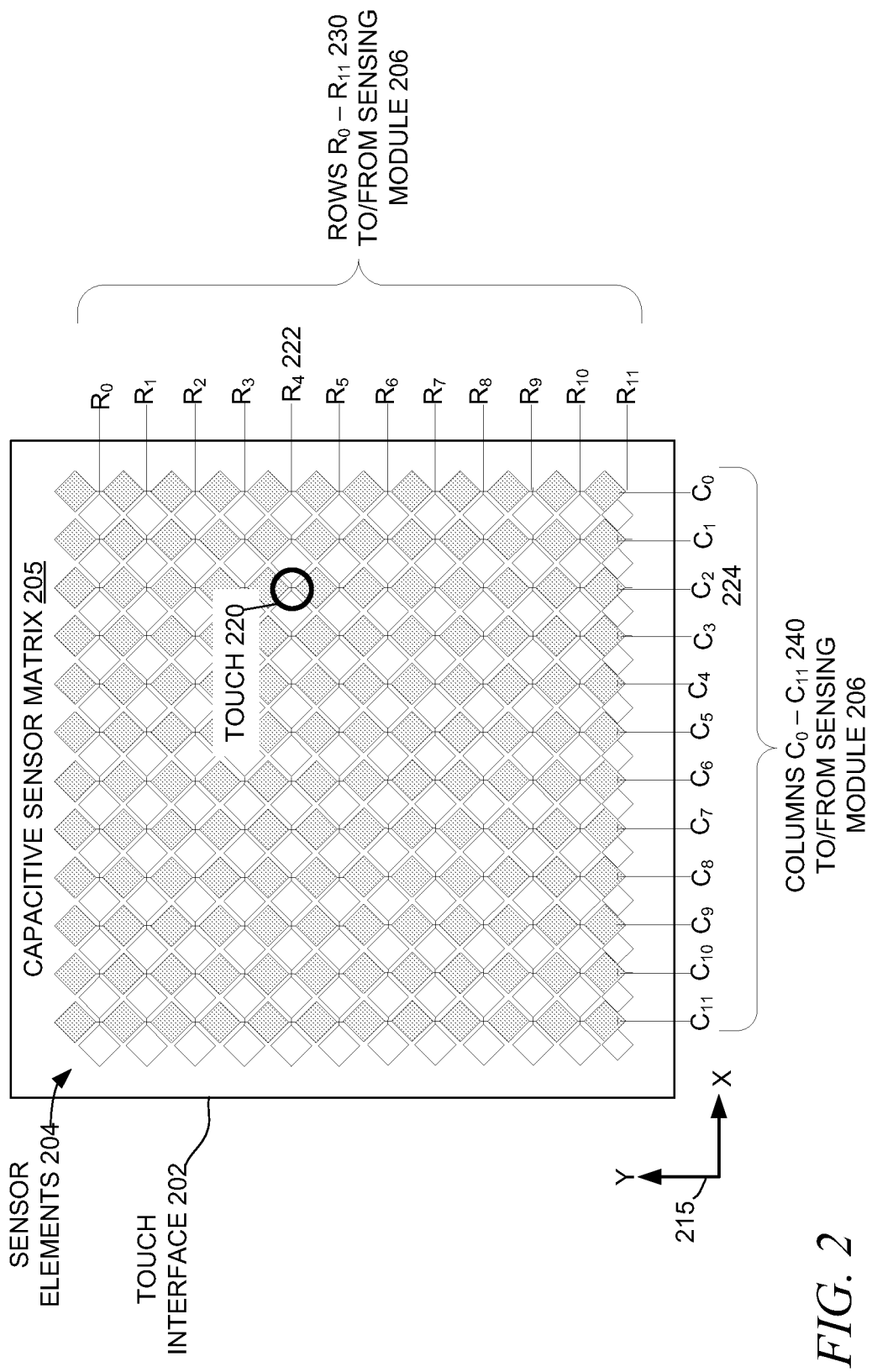
FIG. 2 is a block diagram illustrating a touch interface including a capacitive sensor matrix, in accordance with various embodiments.

FIG. 2 is a block diagram illustrating a touch interface 202 including a capacitive sensor matrix 205, in accordance with various embodiments. FIG. 2 includes rows $R_0$-$R_{11}$ 230 and columns $C_0$-$C_{11}$ 240 of sensor elements 204 arranged in a matrix. The rows $R_0$-$R_{11}$ 230 and the columns $C_0$-$C_{11}$ 240 of sensor elements 204 are shown to be coupled with the sensing module 206. In scan operations described in more detail below, each of the rows $R_0$-$R_{11}$ 230 and each of the columns $C_0$-$C_{11}$ 240 of sensor elements may operate as both transmit and receive electrodes.

In the capacitive sensor matrix 205, each of the rows $R_0$-$R_{11}$ 230 of the sensor elements 204 is shown to cross with each of the columns $C_0$-$C_{11}$ 240 of the sensor elements 204. In an embodiment, galvanic isolation is maintained between the rows $R_0$-$R_{11}$ 230 and the columns $C_0$-$C_{11}$ 240. In an embodiment, each of the columns $C_0$-$C_{11}$ 240 may be associated with an X-coordinate or range of X-coordinates of the X-Y plane 215 and each of the rows $R_0$-$R_{11}$ 230 may be associated with a Y-coordinate or range of Y-coordinates of the X-Y plane 215.

Although the sensor elements 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. The sensor elements 204 may comprise all or a portion of the surface area of the touch interface 202. The sensor elements 204 and patterns of the sensor elements 204 may be formed on or through one or more layers of the touch interface 202.

A touch 220 proximate to or in contact with the sensing module 206 is shown relative to the sensor elements 204 where a conductive object is placed relative to the touch interface 202. As will be discussed below beginning with FIG. 3, the sensing module 206 may operate in various scan modes to detect touches and the sensing module 206 may detect a touch pattern using multiple scan modes. The detected touch pattern may be used as input (e.g., a gesture) to the sensing system 100 or to a system external to the sensing system 100.

Figure 3:
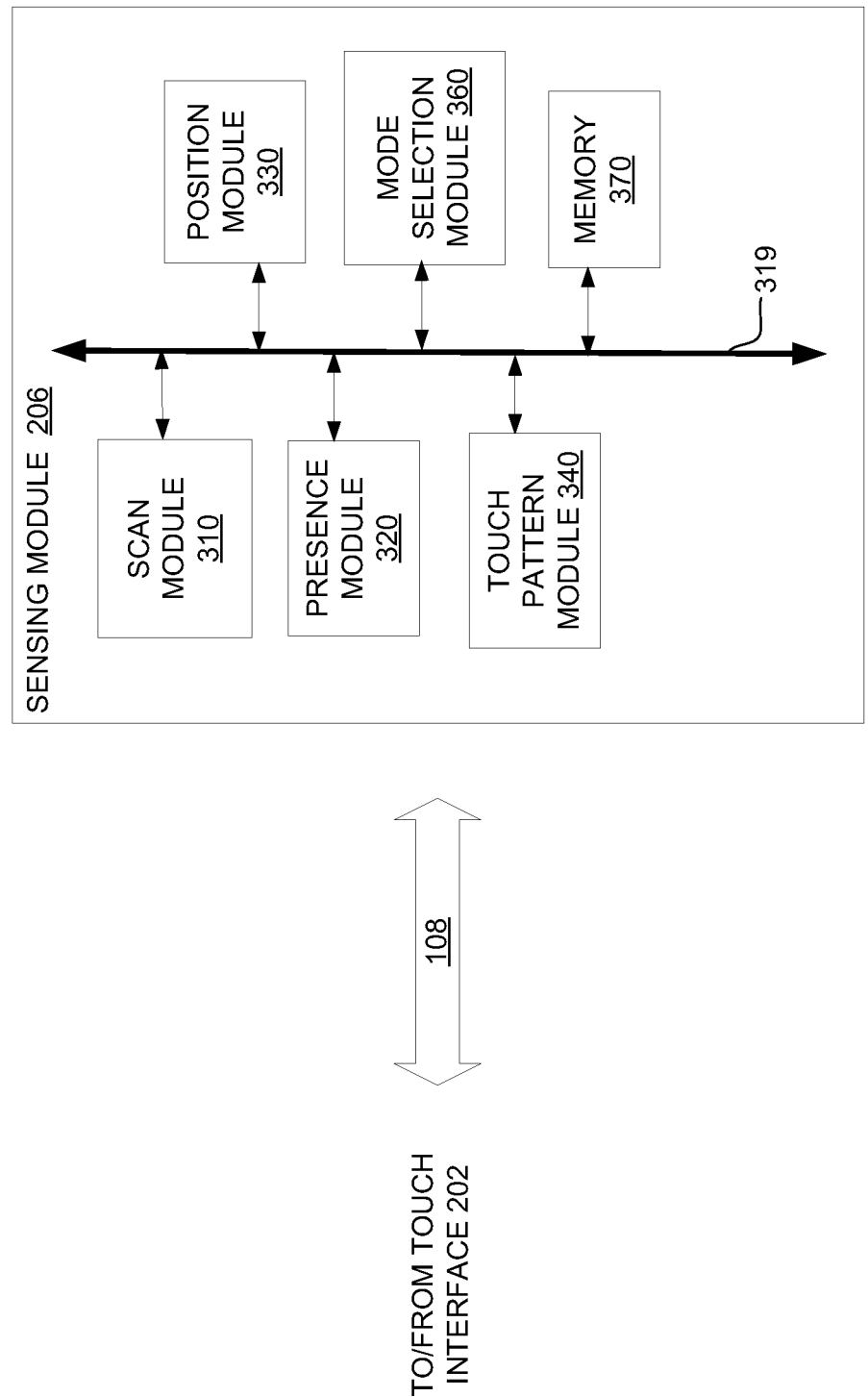
FIG. 3 is a block diagram illustrating the sensing module of FIG. 1, in accordance with embodiments.

FIG. 3 is a block diagram illustrating the sensing module 206 of FIG. 2, in accordance with embodiments. The sensing module 206 includes a scan module 310, a presence module 320, a mode selection module 360, a touch pattern module 340, a position module 330, and a memory 370 coupled to one another through a bus 319, any of which may be implemented using hardware, software, or a combination of hardware and software.

In an embodiment, the scan module 310 scans the sensor elements 204 of the touch interface 202 for sensor signals and the presence module 320 can determine, based on the sensor signals, whether one or more conductive objects are proximate to or in contact with the touch interface 202. A detected touch may include one actual touch or multiple actual touches. In an example scan operation, the scan module 310 excites one or more of the sensor elements 204 and then receives, from the same or other of the sensor elements 204, a sensor signal that reflects a capacitance associated with the excited one or more sensor elements 204 and the associated touch object(s). The frequency of the scan operation is the frequency in hertz (Hz), in which all of the targeted sensors get measured for changes in capacitance (e.g., 120 Hz). The frequency of the scan may also be referred to as the refresh rate or the scan rate. It will be noted that the number of targeted sensors may be varied from scan to scan. The scan module 310 may include an analog-to-digital converter (not shown) to convert sensor signals, which in this embodiment are analog captures of voltage and charge, to digital representations. The presence module 320 can then detect presence of a conductive object if, for example, the digital value meets or exceeds a threshold of an equivalent capacitance or falls within upper and lower threshold levels.

The sensor signal that reflects the capacitance, introduced above, may reflect a self-capacitance between one or more of the sensor elements 204 and a ground reference (not shown). For example, the scan module 310 may excite (e.g., apply a signal to) an electrode (e.g., the row $R_4$ 222 of FIG. 2) and then receive the sensor signal through the same electrode (e.g., the row $R_4$ 222) that represents the self-capacitance between the row $R_4$ 222 and the ground reference. In an embodiment, the presence module 320 can detect the presence of the touch 220 proximate to row $R_4$ 222, based on a difference between the measured self-capacitance when the touch 220 is not present and the measured self-capacitance when the touch 220 is present. This is an example of an axial scan mode in which a sensor signal of each scanned electrode can indicate presence of an input object relative to that electrode but does not indicate where along the electrode the presence is located. For some embodiments, self-capacitance scans consume less energy (e.g., due to shorter scan time and fewer measurements needed) than the mutual-capacitance scans discussed below.

The sensor signal that reflects the capacitance, introduced above, may reflect a mutual-capacitance between two or more of the sensor elements 204. Referring again to FIG. 2, the scan module 310 may excite a transmit electrode (e.g., row $R_4$ 222) and then receive a sensor signal through a receive electrode (e.g., column $C_2$ 224) that represents a mutual-capacitance between the sensor electrodes where the transmit electrode (e.g., row $R_4$ 222) and the receive electrode (e.g., column $C_2$ 224) cross. The presence module 320 can detect the presence of the touch 220 based on the measured mutual-capacitance when the touch 220 is not present and the measured mutual-capacitance when the touch 220 is present. This is an example of an all points addressable scan mode in which the change in mutual-capacitance of each scanned transmit-receive electrode intersection can indicate presence at that intersection.

In an embodiment, each electrode (e.g., the columns $C_0$-$C_{11}$ 240) is associated with a position coordinate (e.g., an X-coordinate) along an axis. The position module 330 can determine the position coordinate (e.g., the X-coordinate) of a touch as the position coordinate of the electrode where the peak change in sensor signal, for example, is observed. Alternatively or additionally, the position module 330 may determine the position coordinate of the touch through finding the centroid of sensor signals distributed over multiple adjacent electrodes. In an embodiment, the scan module 310 can switch the designation of transmit and receive electrodes between the rows $R_0$-$R_{11}$ 230 and the columns $C_0$-$C_{11}$ 240 and the presence module 320 and position module 330 can detect presence and determine position (e.g., X-Y position) along multiple axes (e.g., in the X-Y plane 215 of FIG. 2) based on the switched designation of transmit and receive electrodes.

The scan module 310 may include or utilize a multiplexer or switch matrix (not shown) to distribute excitation signals to one or more selected electrodes where the selected electrodes are the total set or a subset of the total set of electrodes available for excitation. Likewise, the scan module 310 may include or utilize the same or a different multiplexer (not shown) to receive current from one or more selected electrodes. In this way, the scan module 310 can scan selected portions or areas (e.g., targeted portions) of the capacitive sensor matrix 205 in an axial scan mode and/or an all points addressable scan mode for presence of an input object. In embodiments, scanning a targeted portion of the capacitive sensor matrix 205 requires less energy than scanning the entire capacitive sensor matrix 205. Furthermore, unintentional touches placed proximate to un-scanned portions of the capacitive sensor matrix 205, for example, fingers gripping a hand-held device, will not be detected.

The scan module 310 may operate in different scan modes. A scan mode may be characterized by scan frequency, the property measured by the scan (e.g., self-capacitance, mutual-capacitance), the number and location of sensors scanned, how the sensors are excited (e.g., through current), power consumption of the scan, and other characteristics of a scan operation. For example, one scan mode of the scan module 310 may include a self-capacitance scan of the columns $C_0$-$C_{11}$ 240 of FIG. 2 at 20 Hz while another scan mode may include a self-capacitance scan of the same columns $C_0$-$C_{11}$ 240 at 50 Hz. Yet another example scan mode of the scan module 310 may include a mutual-capacitance scan of the capacitive sensor matrix 205 (e.g., all intersections or targeted intersections) at 120 Hz. Thus, in various embodiments, different scan modes may comprise different combinations of characteristics of a scan operation.

The touch pattern module 340 is used to detect touch patterns (e.g., a pattern of one or more touches). A touch pattern may include one or more portions and each portion may include, for example, a start of a touch, lift-off of a touch, durations of one or more touches, a duration between touches, a sequence of touches, shapes (e.g., a two or three-dimensional shape) of one or more touches, positions of one or more touches, movements of one or more touches (e.g., measured as distance, velocity, acceleration), proximities or hovering of one or more input objects over a touch interface, forces associated with one or more touches, other attributes of a touch pattern, and/or a combination of these. Alternatively or additionally to detecting entire touch patterns, the touch pattern module 340 may detect portions of the touch patterns.

In some embodiments, different scan modes can be used to detect different portions of a touch pattern. The mode selection module 360 is used to select a scan mode for the scan module 310 to operate under as different portions of touch patterns are detected. In an embodiment, the mode selection module 360 causes the scan module 310 to switch scan modes responsive to the presence module 320 and/or the touch pattern module 340 detecting the presence or absence of a portion of a touch pattern.

Figure 4:
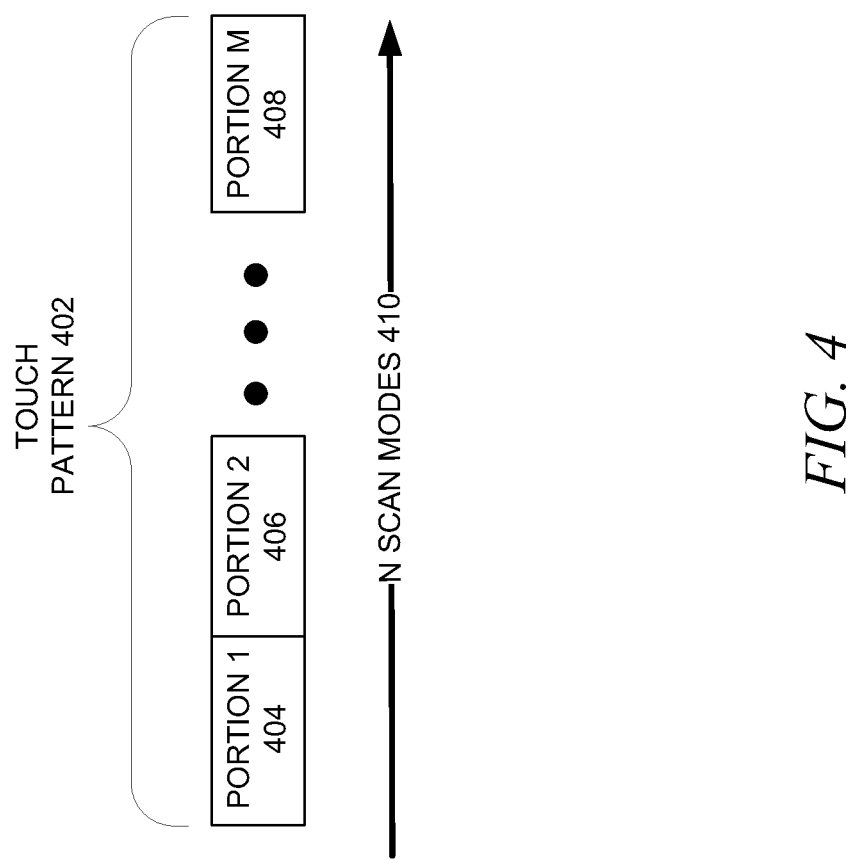
FIG. 4 is a block diagram illustrating N scan modes used to detect M portions of a touch pattern, in accordance with embodiments.

FIG. 4 is a block diagram illustrating N scan modes 410 used to detect M portions of a touch pattern 402, in accordance with embodiments. FIG. 4 is shown to include a touch pattern 402 comprised of portion 1 404 and portion 2 406 to portion M 408. The N scan modes 410 of FIG. 4 are to illustrate that the scan module 310 of FIG. 3 can operate in the N scan modes 410 to achieve the detection of the M portions of the touch pattern 402. For example, each of portion 1 404 and portion 2 406 through portion M 408 may include one or more of: a start of a touch, lift-off of a touch, durations of one or more touches, a duration between touches, a sequence of touches, shapes of one or more touches, positions of one or more touches, movements of one or more touches, multiple simultaneous touches, proximities or hovering of one or more input objects over a touch interface, forces associated with one or more touches, other attributes of a touch pattern, and/or a combination of these. To detect the portions, the scan module 310 of FIG. 3 may operate in the N scan modes 410. As introduced above, the mode selection module 360 may switch between the N scan modes 410 based on detection of the various portions (e.g., portion 1 404 and portion 2 406 to portion M 408).

In embodiments discussed below with respect to FIGS. 5-7, a touch sequence is discussed, which is an example touch pattern. The touch sequence includes multiple portions (e.g., starts of touches, lift-off of touches, durations of touches, and duration between touches) detected through two scan modes and evaluated to determine whether they correspond with a touch sequence stored in the memory 370 of FIG. 3.

Figure 5:
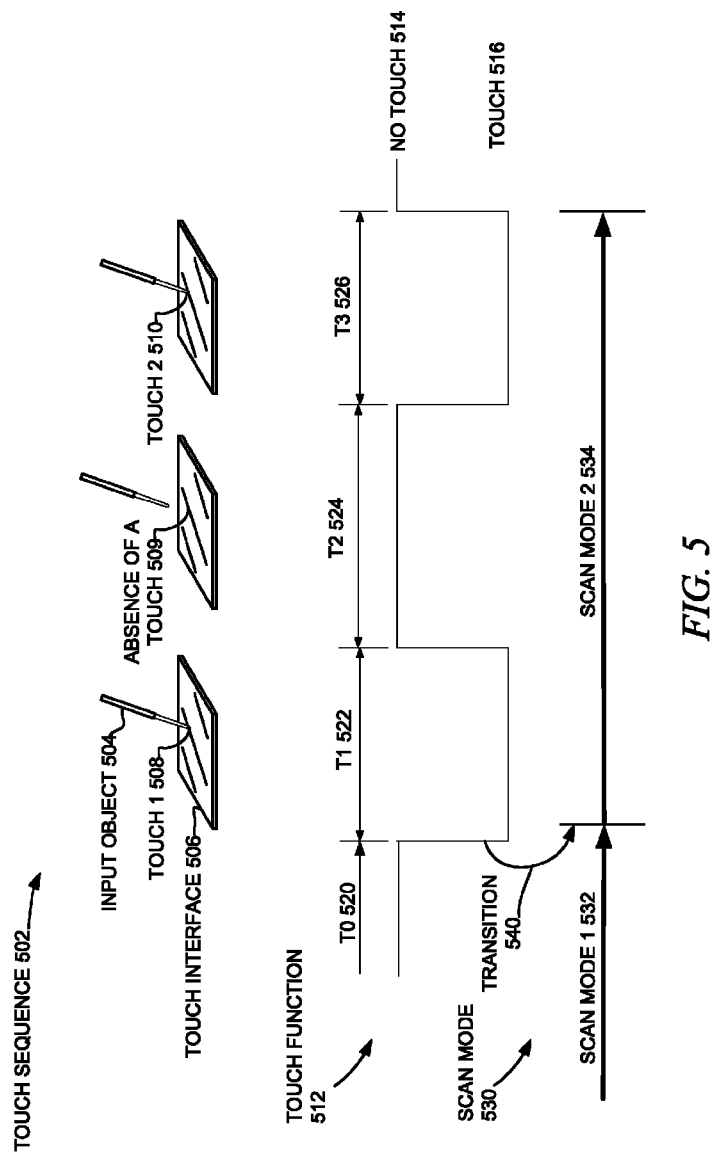
FIG. 5 is a block diagram illustrating two scan modes used to detect a touch sequence, in accordance with an embodiment.

FIG. 5 is a block diagram showing scan mode 1 532 and scan mode 2 534 used to detect a touch sequence 502, in accordance with an embodiment. The touch sequence 502 is modeled by the touch function 512, which in this example indicates a touch 516 as logical low and no touch 514 as logical high. The touch sequence 502 may be a tap-tap gesture. The duration T1 522 of the touch function 512 represents the duration of touch 1 508 (e.g., the time that the input object 504 is on or proximate to the touch interface 506), the duration T2 524 represents the duration of the absence of a touch 509 (e.g., the time that the input object 504 is not on or proximate to the touch interface 506), and the duration T3 526 represents the duration of the touch 2 510. T1 522 and T3 526 need not be equal, and likewise, the duration T2 524 of the absence of a touch need not be equal to either the duration T1 522 or the duration T3 526. The scan mode 530 shows the scan module 310 of FIG. 3 operating in scan mode 1 532 during T0 520, transitioning to scan mode 2 534 upon detection of input object 504 on or proximate to the touch interface 506, and scan mode 2 534 during the remainder of T1 522 and all of T2 524 and T3 526.

In an embodiment, one portion of the touch sequence 502 includes the start of the touch 1 508 (e.g., at the transition between T0 520 and T1 522) and responsive to the presence module 320 of FIG. 3 detecting the start of the touch 1 508, the mode selection module 360 of FIG. 3 initiates a transition 540 of the scan module 310 from operating in scan mode 1 532 to operating in scan mode 2 534. The remaining portions of the touch sequence 502 may include the duration T1 522 of the touch 1 508, the lift-off of touch 1 508, the duration T2 524 of the absence of a touch 509 between touch 1 508 and touch 2 510, the start of touch 2 510, the duration T3 526 of the touch 2 510, and the lift-off of touch 2 510. In an embodiment, while the scan module 310 is operating in scan mode 2 534, the presence module 320 and/or the touch pattern module 340 of FIG. 3 detect the remaining portions of the touch sequence 502. The touch pattern module 340 of FIG. 3 recognizes and detects the touch sequence 502 if the durations T1 522, T2 524, and T3 526 fall within acceptable (e.g., selected) ranges.

FIG. 6 is a table diagram illustrating selected duration ranges for portions of a valid touch sequence, in accordance with an embodiment. The table 600 illustrates duration ranges, from minimum to maximum, for touch 1 508 (T1 522), the absence of the touch 509 (T2 524), and for touch 2 510 (T3 526). In an embodiment, the selected duration ranges (discussed below) represent target durations of a valid tap-tap gesture. The selected duration ranges may be selected based on observed durations associated with user tap-tap gestures, however, other duration ranges may be used without departing from the claimed subject matter. Using the selected duration ranges, the touch sequence 502 of FIG. 5 would be considered valid if the duration T1 522 is between a minimum of 80 ms and a maximum of 120 ms, the duration T2 524 is between a minimum of 80 ms and a maximum of 200 ms, and the duration T3 526 is between a minimum of 80 ms and a maximum of 120 ms.

In an embodiment, the sensing system 100 of FIG. 1 consumes less power when the scan module 310 of FIG. 3 operates in scan mode 1 532 of FIG. 5 than when the scan module 310 of FIG. 3 operates in scan mode 2 534 of FIG. 5. The lower power consumption associated with scan mode 1 532 may be attributed, at least in part, to a lower scan frequency of scan mode 1 532 compared to the scan frequency of scan mode 2 534. Scanning with lower frequency can reduce overall power consumption of a system.

The scan frequency or scan rate of the scan module 310 of FIG. 3 may affect the resolution of detecting portions (e.g., and durations) of the touch sequence 502 of FIG. 5. For example, the lower the scan rate, the greater the uncertainty in the time of a touch. The uncertainty may include uncertainty about the time an input object is placed on a touch interface and/or uncertainty about the time the input object is lifted from the touch interface. For example, referring to the touch sequence 502 of FIG. 5, there may be uncertainty in the time touch 1 508 is placed on the touch interface 506 plus the uncertainty in the time touch 1 508 is lifted from the touch interface 506; there may be uncertainty in the time touch 1 508 is lifted from the touch interface 506 plus uncertainty in the time touch 2 510 is placed on the touch interface 506; and there may be uncertainty in the time touch 2 510 is placed on the touch interface 506 plus the uncertainty in the time touch 2 510 is lifted from the touch interface 506.

In an embodiment, if the scan module 310 of FIG. 3 scans at 20 Hz (e.g., one or more sensor signals per 50 ms) in scan mode 1 532 of FIG. 5, the uncertainty in the time touch 1 508 is placed is approximately 50 ms because the touch pattern module 340 of FIG. 3 is not able to determine when touch 1 508 of FIG. 5 was first placed with better than 50 ms granularity. If the scan module 310 of FIG. 3 scans at 50 Hz (e.g., one or more sensor signals per 20 ms) in scan mode 2 534 of FIG. 5, the uncertainty in the time when touch 1 508 is lifted from the touch interface 506, the time touch 2 510 is placed on the touch interface 506, and the time touch 2 510 is lifted from the touch interface 506 is approximately 20 ms because the touch pattern module 340 of FIG. 3 is not able to determine when these events occur with better than 20 ms granularity. Given the scan rates of scan mode 1 532 and scan mode 2 534 of this example, the uncertainty associated with detecting the duration T1 522 is approximately 70 ms and the uncertainty associated with detecting each of the durations T2 524 and T3 526 is approximately 40 ms. The example is continued in the discussion of FIG. 7.

FIG. 7 is a table diagram illustrating ranges of actual detections for portions of the touch sequence 502 of FIG. 5 considered to fall within the selected duration ranges of FIG. 6, in accordance with an embodiment. As discussed with respect to FIG. 5, the scan module 310 of FIG. 3 may scan the touch interface 506 at 20 Hz in scan mode 1 532 and then at 50 Hz in scan mode 2 534. At these scan rates and considering the uncertainties in timing associated with touch 1 508 and touch 2 510, the touch pattern module 340 of FIG. 3 will determine that the selected durations shown in the table 600 of FIG. 6 are met according to the values in table 700. It will be noted that the number of scans and actual duration ranges in table 700 that indicate whether selected duration ranges are met may be different in other embodiments, without departing from the claimed subject matter.

In an embodiment, the touch pattern module 340 of FIG. 3 will determine that T1 522 of FIG. 5 is between 80 ms and 120 ms of FIG. 6 if touch 1 508 of FIG. 5 is proximate to or in contact with the touch interface 506 and is detected as present for two to six consecutive scans including a first scan at 20 Hz and one or more subsequent scans at 50 Hz. If touch 1 508 is detected for less than two scans, or more than six scans (where the first of these scans was the original detection of touch in scan mode 1 532 of FIG. 5), then the duration of touch 1 508 would not be considered to fall within a selected duration range of FIG. 6. The touch pattern module 340 of FIG. 3 will determine that T2 524 of FIG. 5 is between 80 ms and 200 ms of FIG. 6 if the absence of a touch 509 between touch 1 508 and touch 2 510 is detected for four to ten consecutive scans at 50 Hz. If the absence of a touch 509 is detected for less than four scans, or more than ten scans, then the absence of a touch 509 would not be considered to fall within a selected duration range of FIG. 6. The touch pattern module 340 of FIG. 3 will determine that T3 526 of FIG. 5 is between 80 ms and 120 ms of FIG. 6 if touch 2 510 is proximate to or in contact with the touch interface 506 and is detected as present for four to six consecutive scans at 50 Hz. If touch 2 510 is detected for less than four scans or more than six scans, then the duration of touch 2 510 would not be considered to fall within a selected duration range of FIG.

In an embodiment, based on the touch pattern module 340 determining the touch sequence 502 to be invalid, the mode selection module 360 will return the scan module 350 to scan mode 1 532. Upon recognizing a valid touch sequence, the touch pattern module 340 of FIG. 3 may initiate a function of the sensing system 100 of FIG. 1 or a function of another system (not shown).

Figure 10:
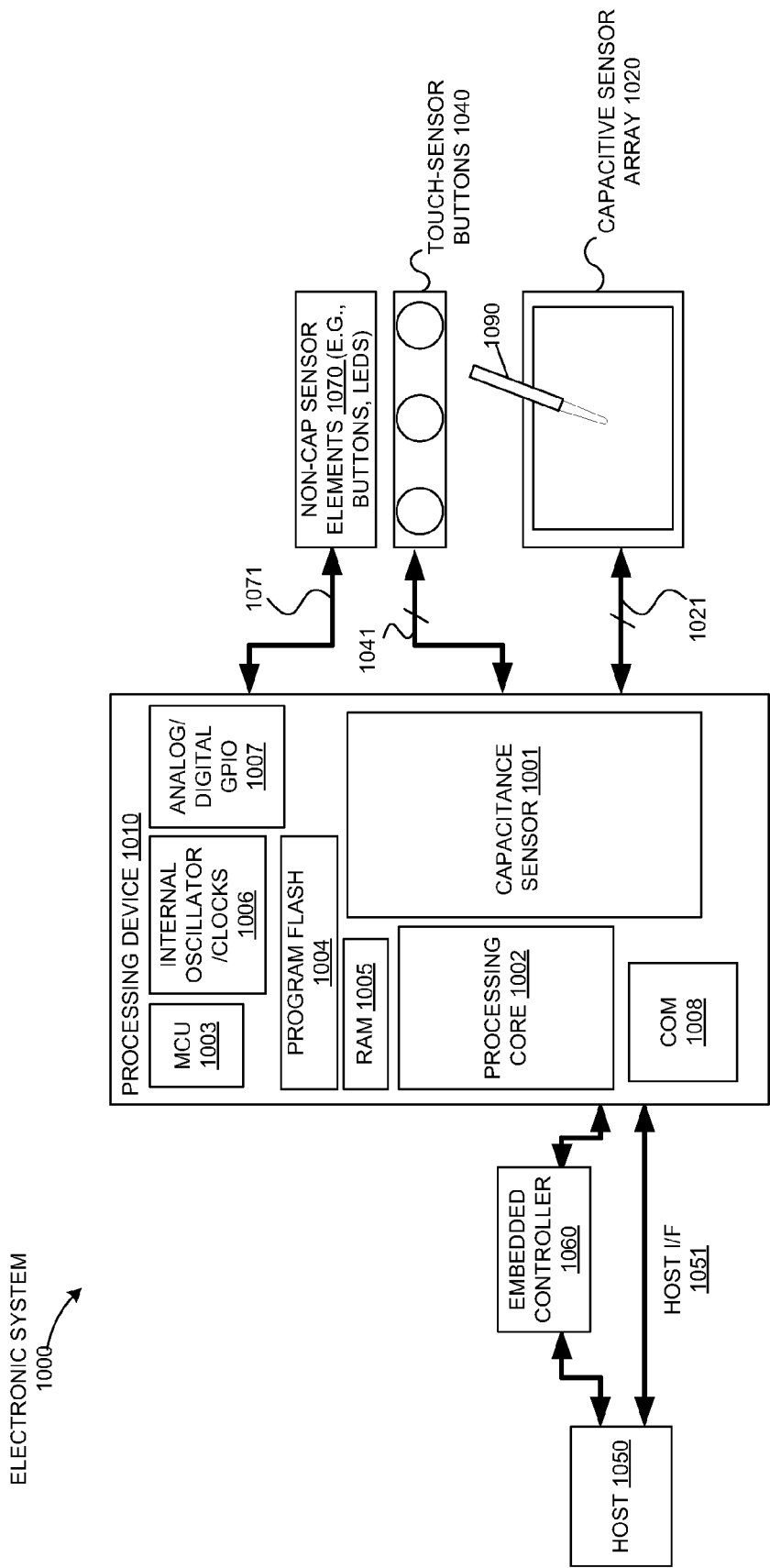
FIG. 10 is a block diagram illustrating an electronic system to detect a presence of a conductive object on a capacitive sensor array, in accordance with various embodiments.

When the sensing module 106 of FIG. 1 is programmable (e.g., through programmable and/or reprogrammable blocks discussed with respect to FIG. 10), numerous parameters associated with detecting a touch pattern may be programmed and/or reprogrammed during compile time of the sensing system 100 and/or during run-time of the sensing system 100. Examples of programmable and reprogrammable parameters may include but not be limited to characteristics of scan modes discussed above (e.g., scan rate), the minimum and maximum detection times of the duration T1 522 of FIG. 5, the minimum and maximum detection times of the duration T2 524, the minimum and maximum detection times of the duration T3 526, the minimum and maximum area of touch 1 508 and/or touch 510 on the touch interface 506, the minimum and maximum absolute or relative positions of touch 1 508 and touch 2 510, and the maximum distance between a determined position of touch 1 508 and a determined position of touch 2 510. Thus, scan rates can be tuned to minimize power consumption while still allowing touch sequences and portions thereof to be detected with acceptable levels of confidence. In addition to reducing the scan rate, further power savings can be achieved by reducing the number of sensors scanned as described with respect to FIG. 8.

Figure 8:
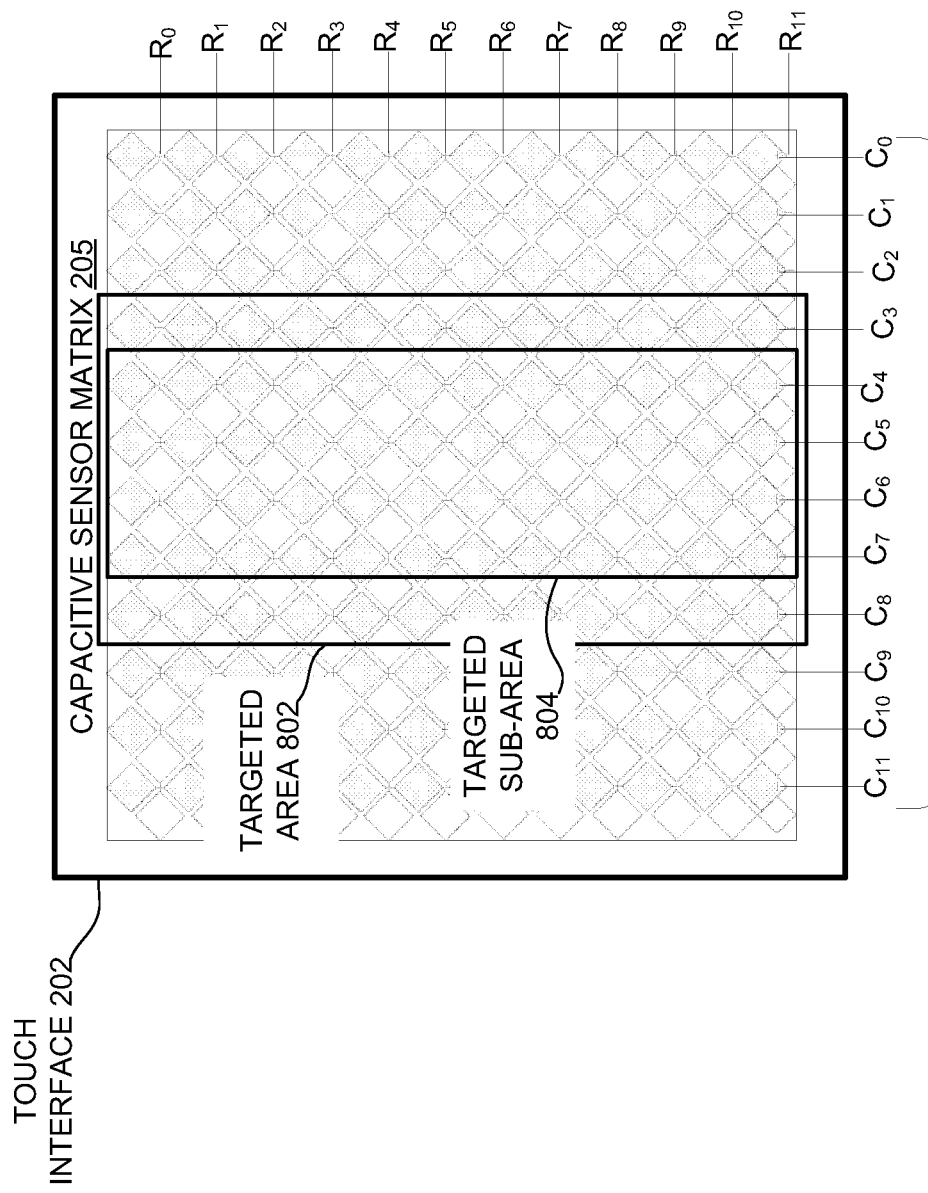
FIG. 8 is a block diagram illustrating a targeted area and a targeted sub-area of a capacitive sensor matrix, in accordance with an embodiment.

FIG. 8 is a block diagram illustrating a targeted area 802 and a targeted sub-area 804 of the capacitive sensor matrix 205, in accordance with an embodiment. The scan modes in some embodiments described above may include self-capacitance scans (e.g., scans of columns $C_0$-$C_u$ 840) to detect a touch presence along one axis. A reduced number of sensor elements may be scanned in the scan modes by scanning a targeted area 802 of the capacitive sensor matrix 205. For example, scan modes may include self-capacitance scans of columns C3 through C8 of the targeted area 802. For example, a lower power consumption associated with scan mode 1 532 of FIG. 5 may be attributed, at least in part, to a fewer number of sensor elements being measured when in scan mode 1 532 compared to the number of sensor elements measured in scan mode 2 534. Scanning the fewer number of sensor elements can reduce overall power consumption of a system. In an embodiment, the power savings that can be realized by limiting scanning to targeted areas is roughly linear to the number of sensors scanned. Furthermore, the potential for detecting unintentional touch sequences can be reduced by limiting the touch area available to receive input during a scan mode. In some use cases, unintentional touches occur at the side of the touchscreen, for example, due to a hand holding a phone including a touchscreen. It will be noted that any number of targeted areas located anywhere on the capacitive sensor matrix may be defined and scanned as part of one or more of the scan modes described herein, without departing from the claimed subject matter. For example, one or more scan modes may include self-capacitance and/or mutual capacitance scans of the targeted area 802 and one or more other scan modes may include self-capacitance and/or mutual capacitance scans of the targeted sub-area 804. In some embodiments the targeted sub-area 804 may include all of the targeted area 802 or other areas of the capacitive sensor matrix 205.

Figure 9:
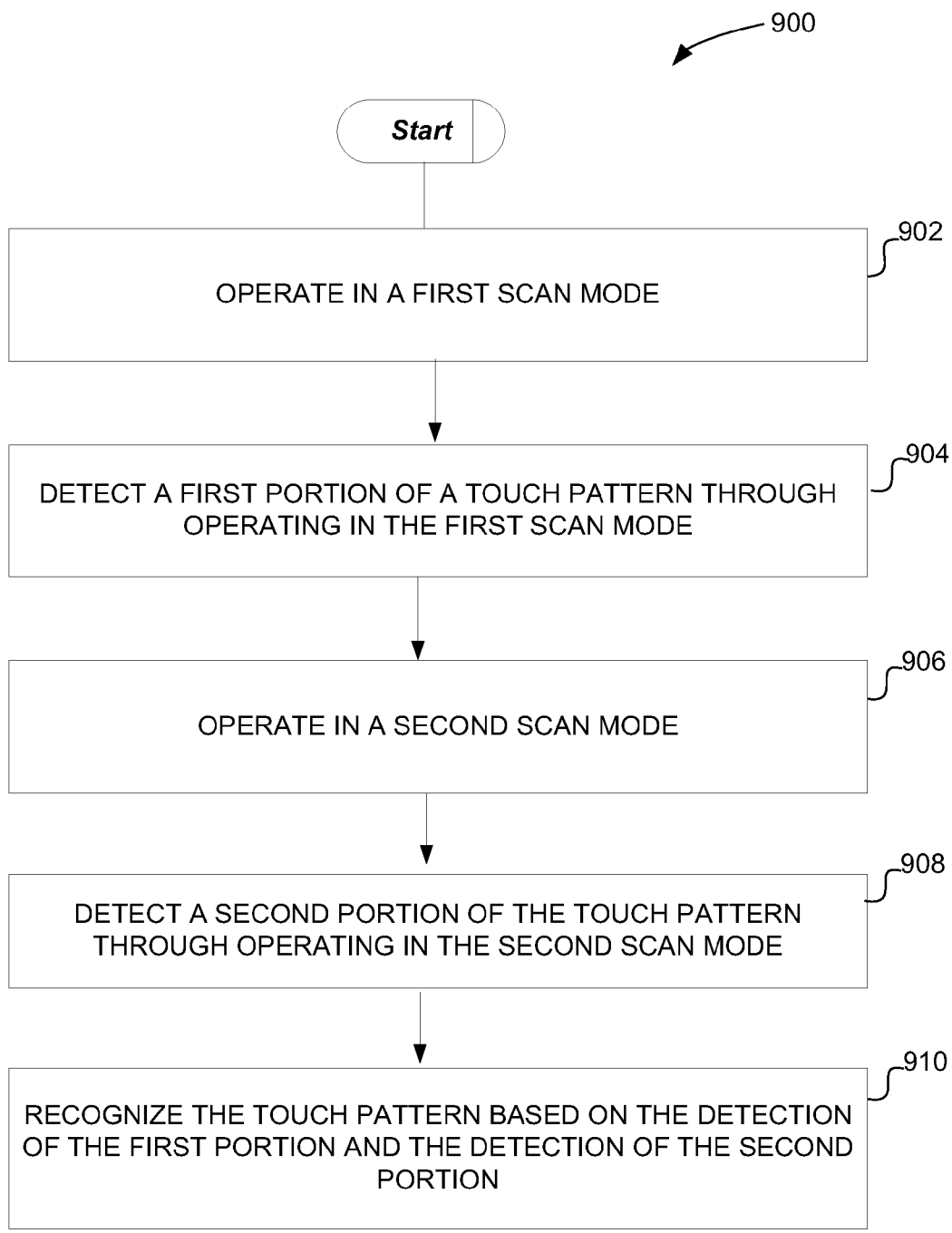
FIG. 9 is a flow diagram illustrating a method for detecting a touch pattern, in accordance with an embodiment.

FIG. 9 is a flow diagram illustrating a method 900 for detecting a touch pattern, in accordance with an embodiment. A description of the method 900 refers to components of drawings referred to above for the purpose of explanation and not to limit the claimed subject matter. It will be noted that the methods described herein may be performed by hardware, software, firmware, state machines, or a combination thereof.

At block 902, the method 900 may include the scan module 310 of FIG. 3 operating in a first scan mode such as scan mode 1 532 of FIG. 5. At block 904, the method 900 may include the presence module 320 of FIG. 3 detecting a first portion of a touch pattern through the scan module 310 operating in the first scan mode. In the example of FIG. 5, the first portion may be the start of the touch 1 508 detected by the presence module 320 of FIG. 3 during scan mode 1 532. The detection of the start of touch 1 508 occurs only if there was first no touch present in a previous scan of the touch interface 506. In an embodiment, the mode selection module 360 of FIG. 3 signals the scan module 310 to operate in the second scan mode responsive to the presence module 320 detecting the start of the touch 508 of the touch sequence 502.

At block 906, the method 900 may include the scan module 310 of FIG. 3 operating in a second scan mode. As introduced above, scan modes (e.g., the first scan mode and the second scan mode) can include one or more characteristics including scan frequency, what is being measured by the scan (e.g., self-capacitance, mutual-capacitance), the number and location of sensors scanned, how the sensors are excited (e.g., through current), power consumption, and other characteristics of a scan operation.

In one embodiment, the scan module 310 is configured to scan at a first frequency (e.g., 20 Hz) in the first scan mode and scan at a second frequency (e.g., 50 Hz) in the second scan mode, wherein the second frequency is greater than the first frequency. Alternatively or additionally, the scan module 310 may scan a targeted area of a touchscreen (e.g., the targeted area 802 of FIG. 8) when the scan module 310 operates in the first scan mode and the scan module 310 may be configured to scan a targeted sub-area of the targeted area (e.g., the targeted sub-area 804 of FIG. 8) when the scan module 310 operates in the second scan mode.

At block 908, the method 900 may include the presence module 320 or the touch pattern module 340 of FIG. 3 detecting a second portion of the touch pattern through the scan module 310 operating in the second scan mode. In the example of FIG. 5, the remaining portions of the touch sequence are detected under scan mode 2. For example, the remaining portions of the touch sequence 502 may include one or more of the duration T1 522 of the touch 1 508, the lift-off of touch 1 508, the duration T2 524 of the absence of a touch 509 between touch 1 508 and touch 2 510, the start of touch 2 510, the duration T3 526 of the touch 2 510, and the lift-off of touch 2 510.

At block 910, the method 900 may include the touch pattern module 340 of FIG. 3 recognizing the touch pattern based on the detection of the first portion of the touch pattern and the second portion of the touch pattern. For example, the touch pattern module 340 may recognize the touch sequence 502 of FIG. 5 based on a determination that the duration T1 522 of touch 1 508, the duration T3 526 of touch 2 510, and the duration T2 524 between touch 1 508 and touch 2 510, fall within the selected duration ranges discussed with respect to FIG. 6. For different embodiments, the touch pattern module 340, responsive to detecting the touch pattern, may generate a signal to initiate an operation such as a wake-up signal to wake-up circuitry (e.g., a processor discussed below with respect to FIG. 10) from a sleep mode, generate an access signal to allow access to protected content, or generate a signal to initiate other functionality.

FIG. 10 is a block diagram illustrating an electronic system 1000 to detect a presence of a conductive object on a capacitive sensor array 1020, in accordance with various embodiments. The electronic system 1000 includes a processing device 1010, the capacitive sensor array 1020, touch-sensor buttons 1040, host processor 1050, embedded controller 1060, and non-capacitance sensor elements 1070. The processing device 1010 may include analog and/or digital general-purpose input/output ("GPIO") ports 1007. GPIO ports 1007 may be programmable.

A digital block array of the processing device 1010 may be configured to implement a variety of digital logic circuits (e.g., DACs, digital filters, or digital control systems) using, in one embodiment, configurable user modules ("UMs"). The digital block array may be coupled to a system bus. Processing device 1010 may also include memory, such as random access memory ("RAM") 1005 and program flash 1004. RAM 1005 may be static RAM ("SRAM"), and program flash 1004 may be a non-volatile storage, which may be used to store firmware (e.g., control algorithms executable by processing core 1002 to implement operations described herein). The memory may include instructions that when executed perform the method described herein. Processing device 1010 may also include a microcontroller unit ("MCU") 1003 coupled to the memory and the processing core 1002.

As illustrated, capacitance sensor 1001 may be integrated into processing device 1010. Capacitance sensor 1001 may include analog I/O for coupling to an external component, such as capacitive sensor array 1020, touch-sensor buttons 1040, and/or other devices. Capacitance sensor 1001 and processing device 1010 are described in more detail below.

The embodiments described herein can be used in any capacitive sensor array application, for example, the capacitive sensor array 1020 may be a touch screen, a touchpad, a touch-sensor slider, or touch-sensor buttons 1040 (e.g., capacitance sensor buttons). Embodiments described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 1070, including but not limited to pick buttons, sliders (e.g., display brightness and contrast), scroll-wheels, multimedia control (e.g., volume, track advance) handwriting recognition, and numeric keypad operation.

In one embodiment, the electronic system 1000 includes a capacitive sensor array 1020 of sensor elements coupled to the processing device 1010 via bus 1021. In an embodiment, the capacitive sensor array may include sensor elements 204 of FIG. 2. The capacitive sensor array 1020 of the sensor elements may include a one-dimensional sensor array in one embodiment and a two dimensional sensor array in another embodiment. Alternatively or additionally, the capacitive sensor array 1020 of the sensor elements may have more dimensions. The capacitive sensor array 1020 may employ projected capacitive technology in which the capacitive sensor elements of the capacitive sensor array are formed in one or more layers upon a substrate (not shown) of the capacitive sensor array 1020. For example, the capacitive sensor elements may be patterned over an image display (e.g., a liquid crystal display) in one or more layers of transparent conducting film deposited on a glass, plastic, or other transparent substrate. A protective transparent layer (e.g., glass or plastic film) may cover the capacitive sensor elements to shield them from environmental damage. In another embodiment the substrate, or protective layer, or both substrate and protective layer may be opaque.

Also, in one embodiment, the capacitive sensor array 1020 of the sensor elements may be sliders, touchpads, touch screens, or other sensing devices. In another embodiment, the electronic system 1000 includes touch-sensor buttons 1040 coupled to the processing device 1010 via bus 1041. Touch-sensor buttons 1040 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 1040 may have a single sensor element to detect the presence of a conductive object. In one embodiment, touch-sensor buttons 1040 may include a capacitive sensor element. Capacitive sensor elements may be used as non-contact sensor elements. These sensor elements, when protected by an insulating layer, offer resistance to severe environments.

The electronic system 1000 may include any combination of one or more of the capacitive sensor array 1020, and/or touch-sensor buttons 1040. In another embodiment, the electronic system 1000 may also include non-capacitance sensor elements 1070 coupled to the processing device 1010 via bus 1071. The non-capacitance sensor elements 1070 may include buttons, light emitting diodes ("LEDs"), information displays (e.g., LCD, AMOLED) and other user interface devices, such as a mouse, a keyboard, or other functional keys that do not require capacitance sensing. In one embodiment, busses 1071, 1041, and 1021 may be a single bus. Alternatively, these buses may be configured into any combination of one or more separate buses.

Processing device 1010 may include internal oscillator/clocks 1006 and communication block ("COM") 1008. The oscillator/clocks block 1006 provides clock signals to one or more of the components of processing device 1010. Communication block 1008 may be used to communicate with an external component, such as a host processor 1050, via host interface ("I/F") line 1051. Alternatively, processing device 1010 may also be coupled to an embedded controller 1060 to communicate with the external components, such as host processor 1050. In one embodiment, the processing device 1010 is configured to communicate with the embedded controller 1060 or the host processor 1050 to send and/or receive data. In one embodiment, the processing device 1010 contains all the functionality of the host 1050 such that host interface line 1051 is not present.

Processing device 1010 may reside on a common carrier substrate such as, for example, an integrated circuit ("IC") die substrate, a multi-chip module substrate, or the like. Alternatively, the components of processing device 1010 may be one or more separate integrated circuits and/or discrete components. In one exemplary embodiment, processing device 1010 may be the Programmable System on a Chip ("PSoC®") processing device, developed by Cypress Semiconductor Corporation, San Jose, Calif. Alternatively, processing device 1010 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 1050, but may include a system that measures the capacitance on the sense device and sends the raw data to another host computer where it is analyzed by an application. In effect, the processing that is done by processing device 1010 may also be done in the host computer.

It is noted that the processing device 1010 of FIG. 10 may measure capacitance using various techniques, such as self-capacitance sensing and mutual-capacitance sensing. The self-capacitance sensing mode is also called single-electrode sensing mode, as each sensor element needs only one connection wire to the sensing circuit. For the self-capacitance sensing mode, touching the dielectric surface of capacitive sensor array 1020 proximate to a sensor element increases the sensor capacitance as the finger capacitance is added to the sensor capacitance. The mutual-capacitance change is detected in the mutual-capacitance-sensing mode, wherein each sensor element uses at least two electrodes: one is a transmitter (TX) electrode and the other is a receiver (RX) electrode. When a finger touches the dielectric surface of capacitive sensor array 1020 proximate to the crossing of a transmit and receive electrode of the capacitance sensor array 1020, the capacitive coupling between the receiver electrode and the transmitter electrode of the capacitance sensor array is decreased as the finger shunts part of the electric field to ground (e.g., chassis or earth). A stylus 1090 used to provide input to the capacitive sensor array 1020 may be active or passive. In some embodiments, the processing device 1010 may provide multi-touch capability through simultaneously detecting multiple conductive objects proximate to different regions of the capacitive sensor array 1020. In an embodiment, the processing device 1010 may include and/or provide the functionality of one or more of the sensing module 106, the scan module 310, the mode selection module 360, the presence module 320, the position module 330, and the touch pattern module 340, as described with respect to the figures above.

Capacitance sensor 1001 may be integrated into the IC of the processing device 1010, or alternatively, in a separate IC. The capacitance sensor 1001 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 1001 may be generated and compiled for incorporation into other integrated circuits. For example, behavioral level code describing capacitance sensor 1001, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1001. It will be noted that the components of the electronic system 1000 may include only some or all of the discrete components described above, or some combination thereof.

In one embodiment, electronic system 1000 is used in a notebook computer. Alternatively, the electronic device may be used in other applications, such as a mobile handset, a personal data assistant ("PDA"), an electronic tablet, a keyboard, a television, a remote control, a monitor, a handheld multi-media device, a handheld video player, a handheld gaming device, or a control panel.

Figure 12:
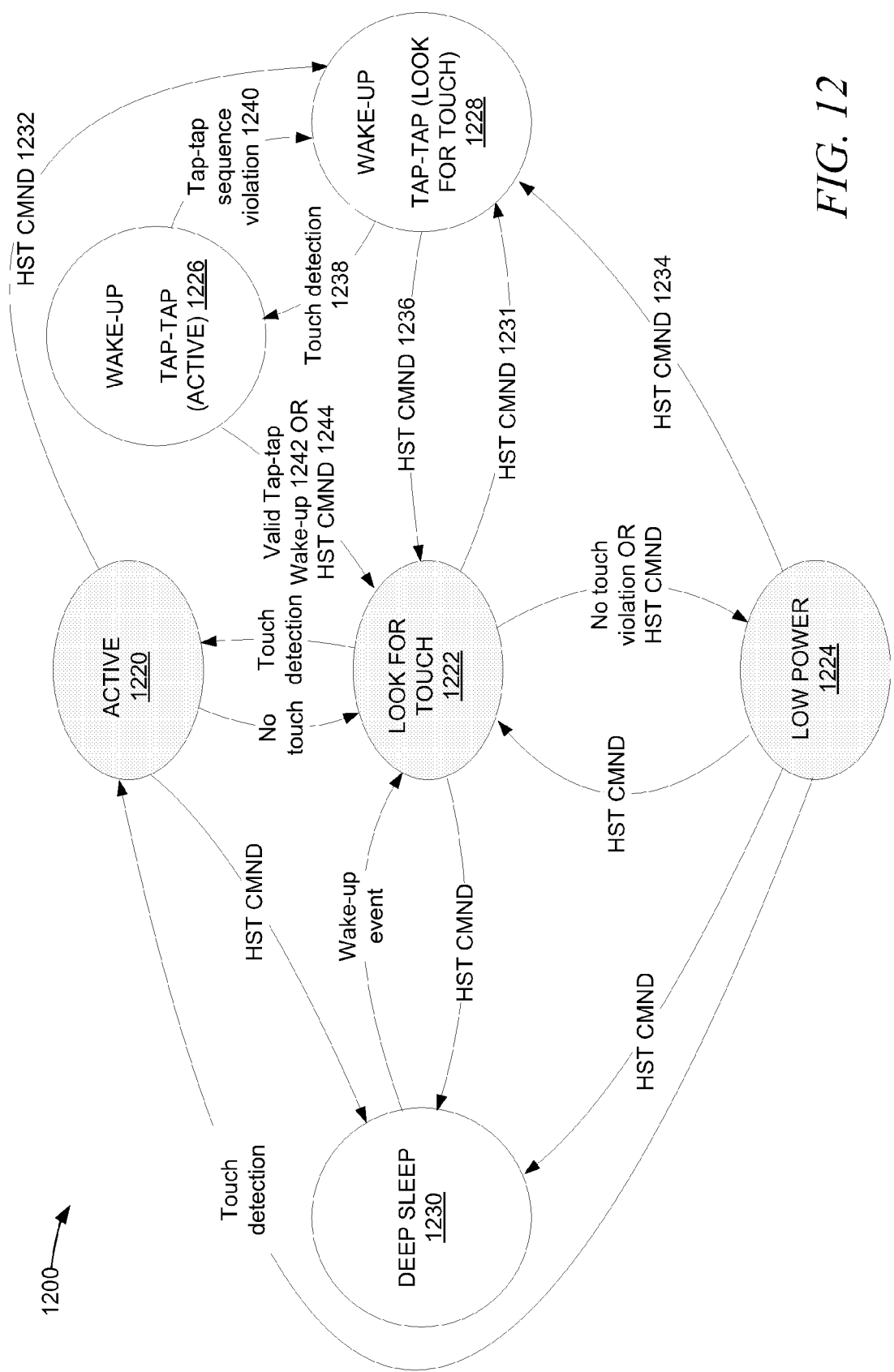
FIG. 12 is a state diagram illustrating power states of an electronic system and transitions between the power states, in accordance with an embodiment.

FIG. 11 is a table diagram illustrating power states of an electronic system, in accordance with an embodiment. FIG. 12 is a state diagram 1200 illustrating the power states and transitions between the power states, in accordance with an embodiment. The state diagram 1200 is shown to include the power states: active 1220, look for touch 1222, low power 1224, tap-tap (active) 1226, tap-tap (look for touch) 1228, and deep sleep 1230. The state diagram 1200 shows transitions between the various states responsive to host commands, touches, absence of touches, and wake up events.

Referring to the table 1100 of FIG. 11, in an embodiment, the ACTIVE power state includes mutual-capacitance scans at 120 Hz, the LOOK FOR TOUCH power state includes self-capacitance scans at 100 Hz, the LOW POWER power state includes self-capacitance scans at 50 Hz, the TAP-TAP (ACTIVE) power state includes self-capacitance scans at 50 Hz, the TAP-TAP (LOOK FOR TOUCH) power state includes self-capacitance scans at 20 Hz, and no scans are made in the DEEP SLEEP power state. In an embodiment, the ACTIVE power state consumes tens of mWs, the DEEP SLEEP power state consumers between 1 µW and 10 µW, and the TAP-TAP wake-up states (e.g., including TAP-TAP (ACTIVE) and TAP-TAP (LOOK FOR TOUCH)) consumes less than one mW of power. The reduced power consumption of the TAP-TAP wake-up states are due in part to the relatively lower scan frequencies and the use of self-capacitance scans. It will be noted that the scan rates and sensing types shown in the table 1100 of FIG. 11 are configurable and the values shown are for illustrative purposes only. Although the example TAP-TAP wake-up states includes TAP-TAP (LOOK FOR TOUCH) 1228 and TAP-TAP (ACTIVE) 1226 in the state diagram 1200, the TAP-TAP wake up states may include a different number of power states (e.g., one power state) and scanning modes (e.g., single-axis self-capacitance, dual axis self-capacitance, targeted area self-capacitance, mutual capacitance, targeted area mutual capacitance) depending on the configured scan rate and sensing type shown in the table 1100 of FIG. 11.

In an embodiment, tap-tap wake-up is a selectable, programmable, or configurable operating mode of the electronic system 1000 of FIG. 10. Tap-tap wake-up can allow a processor of the host 1050 to sleep, saving power, and provide a wake-up signal to the host 1050 without the need of a physical button and avoiding the associated costs and failure modes. When the electronic system 1000 is in the TAP-TAP wake-up states (e.g., including TAP-TAP (LOOK FOR TOUCH) 1228 and TAP-TAP (ACTIVE) 1226 of FIG. 12), the electronic system 1000 of FIG. 10 is asleep aside from portions of the processing device 1010, and that device is also asleep for all but those times needed to take a measurement and analyze same. When in the TAP-TAP wake-up states, the processing device 1100 scans the capacitive sensor array 1020 at a slower rate and looks for a touch pattern (e.g., the touch sequence 502 described above with respect to FIG. 5) to conserve energy while still providing for a reliable trigger (e.g., the touch sequence) to wake-up the host 1050 of FIG. 10.

In an embodiment, numerous parameters of the power states may be programmed and/or reprogrammed during a compile time of the electronic system 1000 and/or run-time of the electronic system 1000. Examples of programmable parameters may include but are not limited to the various parameters of scan modes described above with respect to FIGS. 5-7. In an embodiment, a user may set what they consider to be a valid tap-tap. For example, the user may be directed (e.g., via display) to enter a number of tap-tap events, with the electronic system 1000 keeping track of the minimum and maximum durations of each tap and the gap between the taps, and then using those values to calculate a custom tap-tap sequence optimal for that user. Alternatively or additionally, this could be extended to a continuous learning mode, wherein each accepted tap-tap gesture gets added to a historical list (e.g., of the most recent 10) of such events, and the limits of the setting (e.g., minimum and maximum for each interval) is determined by the values captured in the historical list.

In some embodiments, single-axis self-capacitance scans may be used for sensing while in power states when the presence of a touch is sought. However, a mutual-capacitance scan may be used for sensing while in one or more power states when the positions of touches are sought, when self-capacitance scanning is not available, and/or when mutual-capacitance scanning is lower power than self-capacitance scanning.

As indicated in the table 1100 of FIG. 11, in an embodiment, transitions into the ACTIVE 1220, the LOOK FOR TOUCH 1222, the LOW POWER 1224, and the TAP-TAP (ACTIVE) 1226 power states may be initiated by a touchscreen controller (e.g., the processing device 1010), or as shown in FIG. 12, be triggered by touchscreen events. Transitions into DEEP SLEEP 1230 are initiated by a host (e.g., through commands from the host 1050 of FIG. 10), and transitions into TAP-TAP (LOOK FOR TOUCH) 1228 are initiated by a host or triggered by touchscreen events or the absence of touchscreen events. In embodiments, transitions into ACTIVE, LOW POWER, and LOOK FOR TOUCH power states may also be directed by commands from the host 1050.

For example, FIG. 12 shows that TAP-TAP (LOOK FOR TOUCH) 1228 may be entered through the host commands, HST CMND 1231, HST CMND 1232, or HST CMND 1234 (e.g., which host commands may set a tap-tap wake-up bit) and may be exited through another host command HST CMND 1236 (e.g., which host command may clear the tap-tap wake-up bit). TAP-TAP (LOOK FOT TOUCH) 1228 may also be exited responsive to touch detection 1238, which causes a transition into TAP-TAP (ACTIVE) 1226. If a tap-tap sequence is not detected as valid while in the TAP-TAP (ACTIVE) 1226 power state then TAP-TAP (LOOK FOR TOUCH) may be re-entered through a tap-tap sequence violation 1240. In an embodiment, while there is no host command or touch detected, the electronic system 1000 of FIG. 10 operates in the TAP-TAP (LOOK FOR TOUCH) 1228 power state. Thus, the electronic system 1000 may transition to the TAP-TAP (LOOK FOR TOUCH) 1228 power state because it has just detected the host setting the tap-tap wake-up bit, the tap-tap state machine is idle, or a partially detected tap-tap wake-up event has failed validation.

As noted above, TAP-TAP (ACTIVE) 1226 may be entered from TAP-TAP (LOOK FOR TOUCH) 1228 responsive to touch detection 1238. The electronic system 1000 of FIG. 10 may operate under TAP-TAP (ACTIVE) 1226 while it determines whether a defined sequence of tap-tap wake-up events (e.g., portions of a touch pattern) have occurred (e.g., unless commanded to exit by the host through HST CMND 1244). If a valid tap-tap sequence is not detected (e.g., within a timeout period) then the electronic system 1000 will transition (e.g., through tap-tap sequence violation 1240) back to operation under TAP-TAP (LOOK FOR TOUCH) 1228. If a tap-tap sequence 1242 is detected as valid under TAP-TAP (ACTIVE) 1226 then the processing device 1010 (e.g., the touch controller) will issue system wake-up actions (usually an interrupt to the host 1050), and transition, through valid tap-tap wake-up 1242, to LOOK FOR TOUCH 1222.

When the electronic system 1000 of FIG. 10 operates under TAP-TAP wake-up power states as described herein, a processor of the host 1050 may be allowed to sleep through the wake-detection process, thus saving power. Furthermore, the described embodiments provide for wake-up without the need of a physical button or accelerometer, thus saving material costs and avoiding failure modes of physical parts. Characteristics of the multiple scan modes may be configurable to meet performance targets and at the same time minimize scan frequency, scan time, and scan area, and as a result, minimize overall power consumption of the electronic system 1000.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
    detecting a first portion of a touch sequence through operating in a first scan mode, wherein the detecting of the first portion includes detecting a first touch for a number of one or more scans of the first scan mode;
    detecting a second portion of the touch sequence through operating in a second scan mode, wherein the detecting of the second portion includes detecting the first touch for a number of one or more scans of the second scan mode; and
    recognizing the touch sequence based on the total number of scans of the first scan mode plus the total number of scans of the second scan mode being within a selected range.

2. The method of claim 1, wherein the operating in the second scan mode includes operating in the second scan mode responsive to the detecting of the first portion of the touch sequence.

3. The method of claim 1, wherein the operating in the first scan mode includes scanning at a first frequency and the operating in the second scan mode includes scanning at a second frequency that is greater than the first frequency.

4. The method of claim 1, wherein the detecting of the first portion of the touch sequence includes scanning a targeted area of a touchscreen and the detecting of the second portion of the touch sequence includes scanning the targeted area.

5. The method of claim 1, wherein the detecting of the first portion includes detecting one of a self-capacitance and a mutual capacitance indicating a start of the first touch and the detecting of the second portion includes detecting one of a self-capacitance and a mutual capacitance indicating a duration of the first touch and detecting a second touch.

6. The method of claim 5, wherein the recognizing of the touch sequence includes determining a duration of the second touch and determining a duration between and end of the first touch and a start of the second touch.

7. The method of claim 1, further comprising providing a wake up signal responsive to the recognizing of the touch sequence, the wake up signal to wake a processor.

8. The method of claim 1, further comprising providing an access signal to a processor responsive to the recognizing of the touch sequence, the access signal to allow access to protected content.

9. An apparatus comprising:
    a scan module configured to operate in a first scan mode and a second scan mode;
    a presence module coupled to the scan module, the presence module configured to detect a first portion of a touch pattern through the first scan mode and detect a second portion of the touch pattern through the second scan mode, wherein the detection of the first portion includes detection of a first touch for a number of one or more scans of the first scan mode and the detection of the second portion includes detection of the first touch for a number of one or more scans of the second scan mode; and
    a touch pattern module coupled to the presence module, the touch pattern module configured to recognize the touch pattern based on a sum of the number of one or more scans of the first scan mode and the number of one or more scans of the second scan mode being within a selected range.

10. The apparatus of claim 9, comprising a mode selection module coupled to the scan module and the presence module, the mode selection module configured to signal the scan module to operate in the second scan mode responsive to the presence module detecting the first portion of the touch pattern.

11. The apparatus of claim 9, wherein the scan module is configured to scan at a first frequency in the first scan mode and scan at a second frequency in second scan mode, wherein the second frequency is greater than the first frequency.

12. The apparatus of claim 9, wherein the scan module is configured to scan a targeted area of a touchscreen when the scan module operates in the first scan mode and the scan module is configured to scan a targeted sub-area of the targeted area when the scan module operates in the second scan mode.

13. The apparatus of claim 9, wherein the presence module is configured to detect, through the first scan mode of the scan module, a change in one of a self-capacitance and mutual-capacitance that indicates a start of the first touch detect, through the second scan mode of the scan module, a change in one of a self-capacitance and a mutual-capacitance that indicates a duration of the first touch, and detect a second touch.

14. The apparatus of claim 13, wherein the touch pattern module is configured to recognize the touch pattern based on the duration of the first touch, a duration of the second touch, and a duration between an end of the first touch and a start of the second touch.

15. The apparatus of claim 9, wherein responsive to the recognition of the touch pattern, the touch pattern module is configured to provide a wake-up signal to a processor to allow the processor to wake-up from a sleep mode.

16. The apparatus of claim 9, wherein responsive to the recognition of the touch pattern, the touch pattern module is configured to provide an access signal to allow a processor to access protected content.

17. A system comprising:
   a host processor;
   a touch controller; and
   a touch interface coupled with the touch controller, the touch controller comprising:
      a scan module configured to scan at a first frequency and at a second frequency;
      a presence module coupled to the scan module, the presence module configured to detect a first touch for a number of one or more scans at the first frequency, detect the first touch and a second touch for a number one or more scans at the second frequency, wherein the presence module is configured to scan at the second frequency responsive to the detection of the first attribute of the first touch; and
      a touch pattern module coupled to the presence module, the touch pattern module configured to recognize a touch pattern based on the number of one or more scans at the first frequency and the number of one or more scans at the second frequency, and signal the host processor to wake up from a sleep mode responsive to the recognition of the touch pattern.

18. The system of claim 17, wherein the scan module is configured to scan a targeted area of a touchscreen when the scan module scans at the first frequency and the second frequency.

19. The system of claim 17, wherein the presence module is configured to detect a change in self-capacitance that indicates a start of the first touch and detect a change in self-capacitance that indicates the second touch.

20. The system of claim 17, wherein the touch pattern module is configured to detect the touch pattern based on the duration of the first touch, a duration of the second touch, and a duration between the first touch and the second touch.

\* \* \* \* \*